A. COLEMAN.
GEARING.
APPLICATION FILED SEPT. 5, 1912.
1,099,843.
Patented June 9, 1914.
3 SHEETS—SHEET 3.
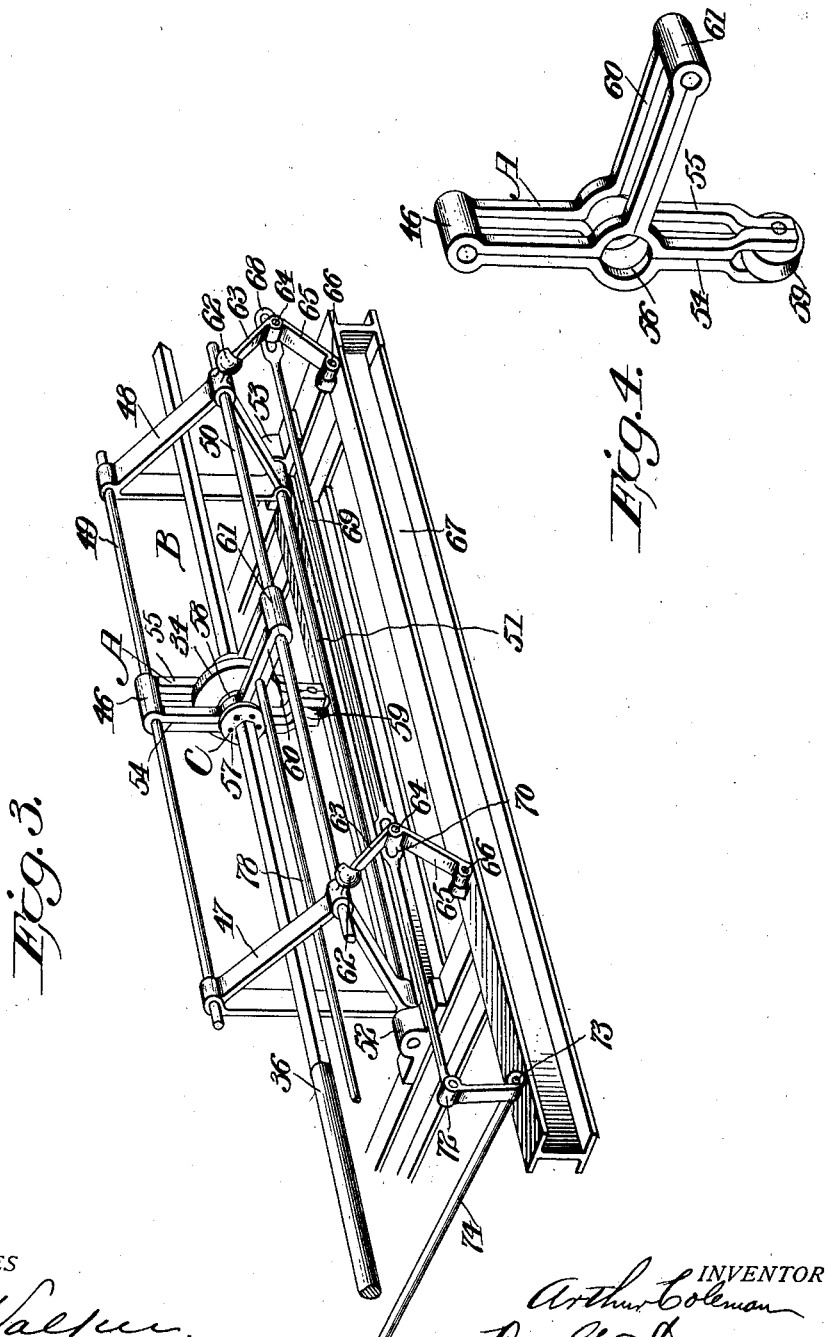

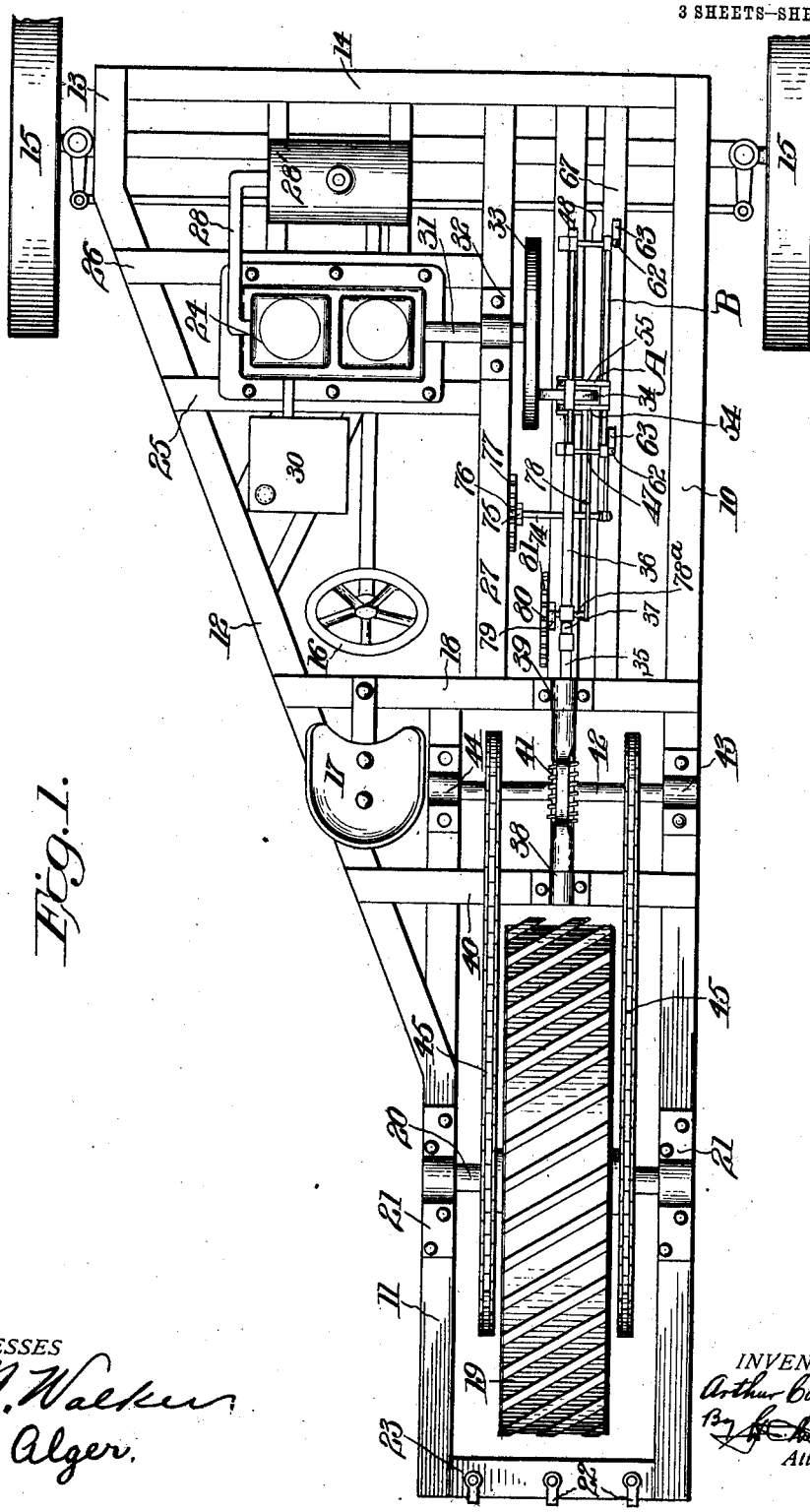

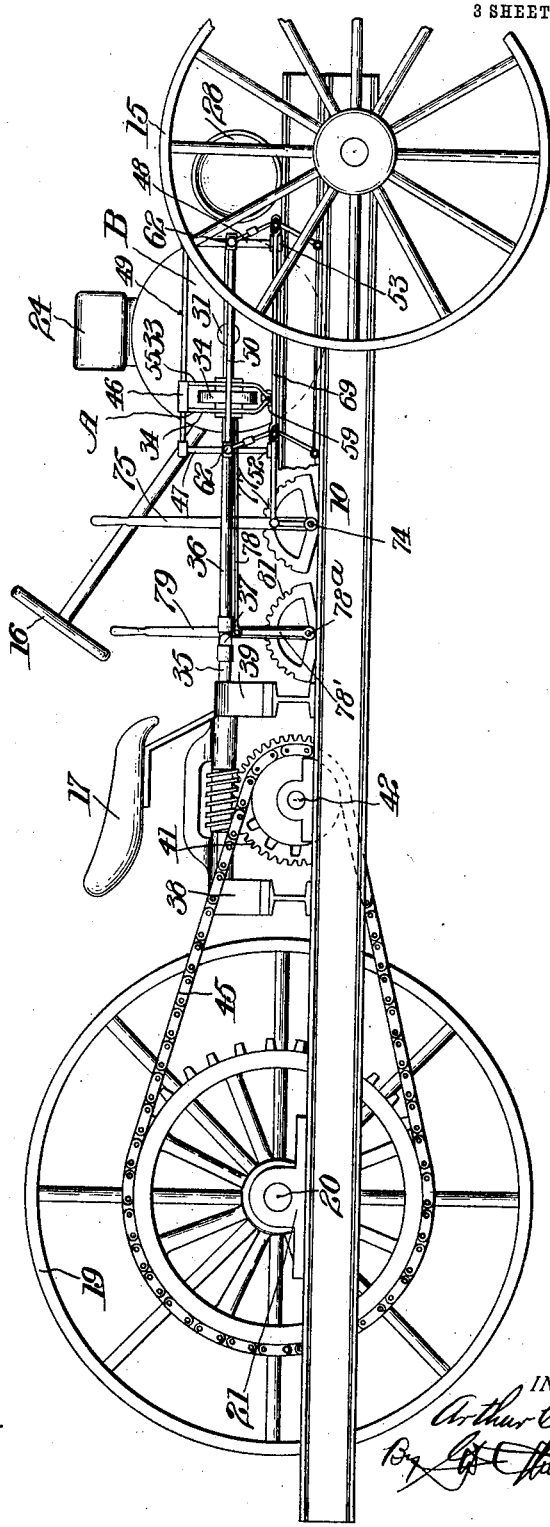

UNITED STATES PATENT OFFICE.

ARTHUR COLEMAN, OF HIGGINS, TEXAS.

GEARING.

1,099,843.   Specification of Letters Patent.   Patented June 9, 1914.

Application filed September 5, 1912. Serial No. 718,745.

*To all whom it may concern:*

Be it known that I, ARTHUR COLEMAN, a citizen of the United States, residing at Higgins, in the county of Lipscomb and State of Texas, have invented certain new and useful Improvements in Gearing, of which the following is a specification.

This invention relates to motor vehicles and particularly to structures for drawing plows or other cultivating implements or other devices over fields or roads.

Traction engines and other motor vehicles now in use possess considerable weight with the result that in their use on cultivated ground it is with difficulty that they are driven over fields. On cultivated ground the weight of the machines packs the cultivated ground while packing of the ground should be avoided. Furthermore, the motor vehicles and traction engines now in use are more or less expensive, due largely, if not entirely to the numerous parts embodied in the machines. These machines are expensive in view of their complicated mechanisms and, by virtue of their intricate natures, they are liable to breakage and derangement of parts, with the result that the farmers or other operators frequently have to discontinue the use of their machines awaiting new parts or repairs. Machines of heavy weight have considerable friction in their operation with the result that there is unnecessary and undue wear on the gears and other parts of the machine, requiring considerable expense of maintenance and impairing the life of the machine. Obviously, a machine of considerable weight requires more gasolene or other fluid to run it than is required in the operation of a lighter machine.

It is therefore one object of my invention to provide a motor vehicle of the nature herein stated embodying among other characteristics such simplicity and economy of structure as to result in the production of a machine at comparatively small expense.

Another object resides in the provision of a light, durable, efficient, and comparatively inexpensive motor vehicle of the character described.

A still further object resides in the provision of a motor vehicle designed particularly as a tractor for drawing cultivating implements or other devices over fields or roads which is constructed of comparatively few parts, thereby reducing the cost of maunfacture, and reducing the possibility of derangement and breakage of parts to practically a minimum.

It is still further designed to provide a motor vehicle of the character stated which will be positive in operation, easily operated and possessing sufficient weight and strength to perform the functions herein recited.

With the above and other objects in view the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 is a top plan view. Fig. 2 is a side elevation. Fig. 3 is a detail perspective view of the frame and carriage for the support and adjustment of the driven disk of the friction gear mechanism. Fig. 4 is a detail perspective view of the driven friction gear carriage.

Referring now more particularly to the accompanying drawings, I employ a framework or chassis composed preferably, although not necessarily, of I-beams with the same constructed somewhat after the fashion of a triangle. For instance, one side of the machine is preferably constructed of a straight elongated sill 10 with the opposite side having a comparatively short side sill 11. These two sills are comparatively close together. Secured to the side sill 11 preferably intermediate the ends thereof is a sill 12 which extends preferably outwardly upon an incline from the sill 11 with its outer end 13 disposed preferably parallel with the opposite sill 10 and with the parallel part 13 of the sill 12 connected at the forward end of the machine to the sill 10 by means of the front sill 14.

Journaled in the sills 10—11 in any suitable manner are the forward ground wheels 15 of the machine and these wheels may be so mounted as to permit of a proper steering of the machine. Any suitable steering mechanism may be employed and as the steering mechanism itself is not a material part of the present invention, a detailed description thereof is unnecessary, letting it suffice to state that these front wheels are steered in any ordinary manner through the instrumentality of a suitable steering wheel 16 so arranged in the machine as to be within ready reach for operation by the operator who may be seated on the seat 17 supported in any suitable manner from the cross piece 18 or from any other part of the machine.

The vehicle employed by me is preferably of the three-wheeled type having the aforesaid two wheels in front and a rear ground wheel 19 at the rear of the machine which is secured preferably to a shaft 20 journaled in suitable bearings 21 secured to the side sills 10—11. This wheel 19 is the driving wheel of the machine and the manner in which it is driven will be hereinafter explained.

Clevises or other suitable devices 22 are preferably secured to the connecting rear sill 23 in any suitable manner and it is preferable to connect these clevises to the sill 23 which is of such a length as to permit the cultivating or other implement to be easily connected or coupled to the tractor and be drawn along evenly and positively in the rear of the tractor and effect an efficient breaking of the ground without danger of either of the front wheels of the motor vehicle straddling broken ground or running in on broken ground.

My improved machine is driven preferably by means of a gasolene engine but any other character of engine may be employed including an electric motor, if desired. For purposes of illustration there is shown in the accompanying drawing a gasolene engine 24 of any desired type which is mounted preferably upon the cross pieces 25 and 26 connecting the sill 12 and beam 27. The engine may be supplied with gasolene through the duct 28 from the tank 28' and a tank 30 may be employed for the purpose of supplying water to the engine to cool the parts thereof. Thus, with the understanding that the engine may be of any suitable type and mounted in any suitable way on the machine, the driving shaft 31 of the engine extends through the bearing 32 on the cross piece 27 and at its outer end carries a friction disk 33 with which disk 33 a driven disk 34 is adapted to frictionally engage for the purpose of driving the machine through the instrumentality of suitable connections between the disk 34 and the driving wheel 19. The connections between the disk 34 and the main driving wheel 19, as preferably employed by me, reside in a worm shaft 35—36 coupled together by means of any suitable type of universal joint 37 with the part 35 of the worm shaft journaled in suitable bearings 38 and 39 on the cross pieces 40 and 18, respectively, and with the threads of the worm 35—36 meshing with a worm pinion 41 fixed on the shaft 42 journaled in suitable bearings 43 and 44, on which shaft 42 are sprocket wheels with which sprocket chains 45 are connected and which chains work over sprocket wheels mounted on the shaft 20 of the main driving wheel 19. Thus, when the disk 34, which is slidable on the outer squared end of the part 36 of the worm shaft is in mesh with the driving disk 33 on the shaft 31, there is effected an efficient driving connection between the disks 33 and 34.

To provide for different speeds and to maintain the disk 34 in any position with relation to the disk 33, I provide suitable means for shifting the disk 34 to various points between the center of the disk 33 and its periphery. To accomplish this adjustment of the disk 34 I mount the same so that it may be thrown toward and away from the disk 33 and also longitudinally of the machine. For instance, I mount the disk 34 in a longitudinally slidable and laterally swinging carriage A. This carriage A is mounted within a swinging frame B consisting of substantially triangular members 47 and 48 connected by rods 49—50 and 51, with the rod 51 serving as a track and fixedly mounted in suitable bearings 52 and 53 on the framework of the machine with the lower ends of the end members 47 and 48 of the frame B mounted for lateral swinging movement on the track rod 51. The carriage A is preferably provided at its upper end with a bearing 46 which is loose on the rod 49 so that the support A may slide longitudinally of the rod 49 and also swing with the frame B when the latter is swung in a manner to be presently explained. This carriage A has side members 54 and 55 provided with eyes 56 adapted to receive the boxings C secured to opposite sides of the disk 34. These boxings C are preferably sectional so that their outer sections 57 may be removed to permit the eyes 56 of the side members of the carriage A to be fitted into the grooves 58 of the boxings. Journaled in the lower portions of the side members 54—55 in any suitable manner is a roller 59 adapted to run upon the track rod 51 so as to facilitate longitudinal sliding movement of the carriage, obviating unnecessary friction. Extending from the side members 54—55 are arms 60 connected together at their outer ends and provided with a bearing 61 adapted to slide on the rod 50 of the frame B.

The carriage A and the frame B may be of other structure than that herein shown and described so long as there is provision made for the swinging of the frame B and for the swinging of the carriage with the frame B and for a longitudinal sliding movement of the carriage and its disk 34 longitudinally of the frame B. I therefore do not wish to be understood as limiting myself to the exact form of frame and carriage just described any further than as set up in the claims appended to this specification.

To drive the machine the disks 33—34 are disposed in frictional relation. To shift the disk 34 with relation to the disk 33 to provide for different speeds and to reverse when desired, it is preferable to disengage the disk 34 from frictional engagement with the disk 33. One manner of effecting this disconnection of the two disks to permit shifting into different speeds is to connect with the aforesaid frame B, preferably at the ends 47—48 thereof by ball and socket connections 62, adjustable toggle levers 63, each of which has its outer end hingedly connected at 64 to the toggle levers 65 hingedly connected at 66 to the beam 67 of the frame. Connected to the pintle of the hinge 64 is a link 68 of a rod 69 which also has a link 70 connected with the pintle of the hinge 64 of the opposite toggle levers 63—65 and which projects upon opposite sides of said pintle. The link 69 has pivotal connection at the upper end of an arm 72 mounted at 73 on the rock shaft 74. This arm 72 is adapted to swing in the same direction as the toggle levers 63—65 in order to operate said levers through the instrumentality of said link 69.

The rock shaft 74 may be rocked by means of a suitable lever 75 provided with a dog 76 adapted to work over the rack 77 whereby the lever may be held by its pawl in engagement with the teeth of the rack 77 to hold the rock shaft 74 in adjusted positions and consequently hold the levers 63—65 in position to hold the frame B outwardly with relation to the disk 33 and consequently hold the disk 34 out of frictional engagement with the disk 33 or, in other words, in the position shown in Fig. 3. Thus, when the frame B and consequently the disk 34 has been thrown out of operative or frictional engagement with the disk 33, that is to say, from the position shown in Fig. 1 to that shown in Fig. 3, the joint or hinge connections 64 between the levers 63 and 65 may be said to be broken. While these parts are in the positions stated, the disk 34 may be easily shifted longitudinally of the frame B to provide for different speeds and for a reverse movement of the machine. After this lateral swinging of the frame B is accomplished, and prior to swinging the frame B laterally to its operative position, the disk 34 is shifted longitudinally of the frame B. One manner of effecting the longitudinal shifting of the disk 34 is to shift the support A on the frame B, the wheel 59 operating on the track-rod 51 facilitating movement of the support without undue friction, it being understood that the bearings 46 and 61 of the support slide on the rods 49 and 50 of the frame B during movement of the wheel 59 over the track-rod 51.

Connected to the support A in any suitable manner is a rod 78 whose outer end is connected to an arm 78' on a rock shaft 78ª on which a lever 79 is mounted and provided with a pawl 80 adapted to engage the teeth of the segmental rack 81. By operating the lever 79 the pawl of the same may be operated over the teeth of the segmental rack 81 to shift the support A and consequently the disk 34 on the frame B. When the support A and disk 34 have been shifted to the proper position, the frame B may then be swung inwardly by manipulation of the lever 75, carrying the support A and disk 34 with it, so that the disk 34 may be once more brought into frictional engagement with the disk 33 and effect an operative connection between the engine and the ground wheel 19 to provide for propulsion of the machine. When the lever 75 is shifted to throw the frame B inwardly, the levers 63—65 are drawn rearwardly of the machine to a point where the hinge connections between the levers 63—65 pass slightly beyond dead centers.

From the foregoing it will be seen that I provide a light, durable, and comparatively inexpensive motor operated machine designed principally as a tractor to draw cultivating implements over ground to cultivate the same. It is obvious, however, that in the use of my machine I am not restricted to its adaptability for drawing cultivating implements from one place to another or over cultivated ground but it is apparent that the machine is equally applicable to draw or drag farming implements or other devices or machines over roadways in their transportation from one place to another.

What is claimed is:

1. In friction gearing, a frame, a driving disk, a driven disk, a frame swingingly mounted on the aforesaid frame adjacent the friction disk, means for swinging the second-mentioned frame laterally, a carriage slidable on said second frame and carrying the driven disk of the friction gearing, and means for sliding said carriage on said second frame.

2. In friction gearing, a frame, a driving and a driven disk, a frame swingingly mounted on the aforesaid frame adjacent the driving disk, means for swinging the second-mentioned frame laterally, a carriage slidable on said second frame and carrying the driven disk, and means for sliding said carriage on said second frame, said carriage having a roller adapted to travel on a part of the second frame.

3. In friction gearing, a frame, a driven disk, a driving disk, a second frame swingingly mounted on the first mentioned frame, a carriage slidably mounted on the swinging frame for the support of the driven disk, means for swinging the first-mentioned frame, and means for sliding said carriage on the swinging frame.

4. In friction gearing, a frame, a driving and a driven disk, a frame swingingly mounted on the first-named frame and located adjacent the driving disk, toggle levers between the swinging frame and the first-named frame, means operatively connected to the toggle levers to operate the same to swing the swinging frame, a carriage slidable on the swinging frame and supporting the driven disk, and means for sliding said carriage on the swinging frame.

5. In friction gearing, a frame, in combination, a driving and a driven disk, a swinging frame mounted on the aforesaid frame, means for swinging said swinging frame, a carriage for the support of the driven disk of the friction gearing slidably mounted on the swinging frame, and means for sliding the carriage whereby varying speeds may be obtained.

6. In friction gearing, a frame, a driving and a driven disk, a frame swingingly mounted on the first-mentioned frame, toggle lever connections between the swinging frame and the first-named frame, a rock shaft journaled in the first-named frame and provided with an arm, a link connection between the toggle lever connections and said arm, a lever for rocking said shaft and operating said arm and link connection to operate the lever connections and thereby swing the swinging frame, a carriage slidably mounted on said swinging frame for the support of the driven disk, and means connected with said carriage to slide the same and the driven friction disk on the swinging frame.

7. In friction gearing, a frame, a driving and a driven disk, a swinging frame mounted on the aforesaid frame, means for swinging the swinging frame, a carriage having slidable connection at its upper end with the swinging frame and also provided with outwardly directed arms which have sliding connection at their outer ends with a portion of said swinging frame, a roller at the lower end of the carriage for sliding engagement with a portion of the swinging frame, said carriage being adapted to support the driven disk of the friction gearing, and means for sliding said carriage on said swinging frame.

8. In friction gearing, a frame, a driven disk mounted on the frame, a driving disk, a swinging frame mounted on the aforesaid frame, a carriage having slidable connection at its upper end with the swinging frame and also provided with outwardly directed arms which have sliding connection at their outer ends with a portion of said swinging frame, a roller at the lower end of the carriage for sliding engagement with a portion of the swinging frame, said carriage being adapted to support the driven disk of the friction gearing, means for sliding said carriage on said swinging frame, toggle lever connections between the swinging frame and the first named frame, a rock shaft journaled in the first-named frame, an arm mounted on the rock shaft, a link connection between said arm and said toggle lever connections, and a lever having connection with the rock shaft to rock the same and thereby operate said toggle lever connections to swing said swinging frame.

In testimony whereof I affix my signature in presence of two witnesses.

ARTHUR COLEMAN.

Witnesses:
John H. Siggers,
Geo. C. Shoemaker.

---

Copies of this patent may be obtained for five cents each, by addressing the "Commissioner of Patents, Washington, D. C."